US007844404B2

(12) United States Patent
Ling et al.

(10) Patent No.: US 7,844,404 B2
(45) Date of Patent: Nov. 30, 2010

(54) SYSTEMS AND METHODS FOR DETERMINING ENGINE TORQUE VALUES

(75) Inventors: Richard Ling, Scottsdale, AZ (US); Oswald George Harris, Tempe, AZ (US); John Rushinsky, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 117 days.

(21) Appl. No.: 12/336,937

(22) Filed: Dec. 17, 2008

(65) Prior Publication Data

US 2010/0153025 A1 Jun. 17, 2010

(51) Int. Cl.
*G01L 3/00* (2006.01)
*G06F 19/00* (2006.01)

(52) U.S. Cl. .......... 702/41

(58) Field of Classification Search .......... 702/41, 702/113

See application file for complete search history.

(56) References Cited

U.S. PATENT DOCUMENTS 5,241,855 A 9/1993 Cullen et al.
5,452,207 A * 9/1995 Hrovat et al. .......... 701/1
5,577,474 A 11/1996 Livshiz et al.
5,771,482 A 6/1998 Rizzoni
6,035,252 A 3/2000 Dixon et al.
6,226,585 B1 5/2001 Cullen
6,397,152 B1 5/2002 Kalweit et al.
6,427,109 B1 * 7/2002 Doering et al. .......... 701/54
6,553,958 B1 * 4/2003 Kolmanovsky et al. .......... 123/295
6,704,638 B2 3/2004 Livshiz et al.
6,904,813 B2 6/2005 Zaremba et al.
7,236,869 B2 6/2007 Buckley et al.
7,389,682 B2 6/2008 JaVaherian
2001/0013329 A1 * 8/2001 Matsumoto et al. .......... 123/295
2003/0097215 A1 * 5/2003 Riedle et al. .......... 701/110
2004/0019417 A1 1/2004 Yasui et al.
2004/0134267 A1 * 7/2004 Boesch et al. .......... 73/118.1
2007/0295067 A1 * 12/2007 Rollinger et al. .......... 73/118.2
2009/0240470 A1 * 9/2009 Ling et al. .......... 702/182

* cited by examiner

*Primary Examiner*—Michael P Nghiem
*Assistant Examiner*—Cindy H Khuu
(74) *Attorney, Agent, or Firm*—Ingrassia Fisher & Lorenz, P.C.

(57) ABSTRACT

A system and method of estimating the torque value of an engine are provided. The method includes generating corrected variable values from engine measured parameters and using a plurality of steady state tables that output corrected engine torque estimates based on various corrected variable values as inputs. In a preferred embodiment, the method also includes a phase compensation technique that converts each steady state table torque estimate into a dynamic torque estimate that closely matches the torque sensor measurements during both transient and steady state engine operations. In addition, also in a preferred embodiment, the method further includes a weighted averaging scheme that combines multiple torque estimates with weighting factors that are optimized based on the accuracy attributes of each torque estimate.

13 Claims, 3 Drawing Sheets

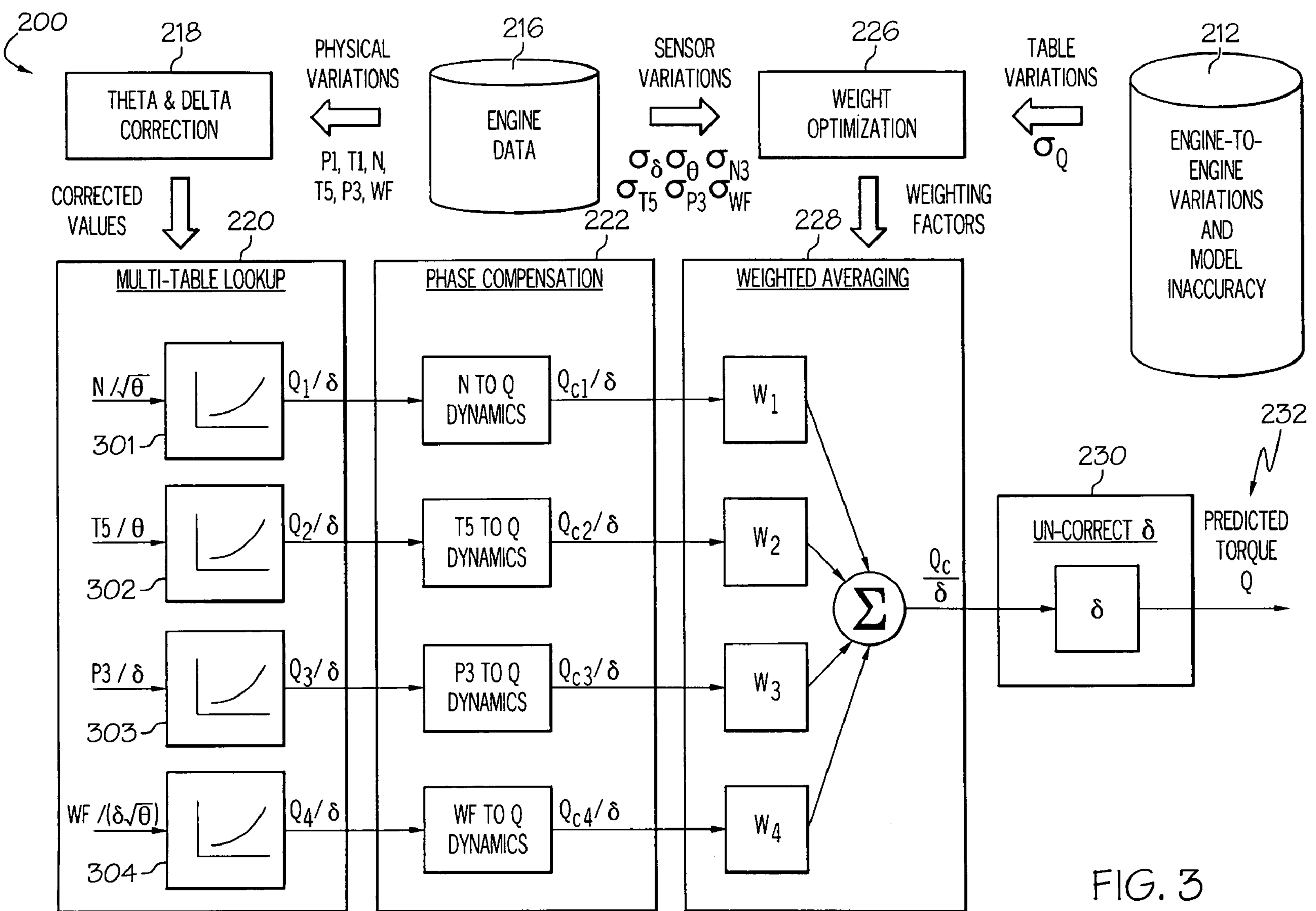
200
218
THETA & DELTA CORRECTION
PHYSICAL VARIATIONS
P1, T1, N, T5, P3, WF
216
ENGINE DATA
SENSOR VARIATIONS
226
WEIGHT OPTIMIZATION
TABLE VARIATIONS
212
ENGINE-TO-ENGINE VARIATIONS AND MODEL INACCURACY
CORRECTED VALUES
220
MULTI-TABLE LOOKUP
222
PHASE COMPENSATION
228
WEIGHTED AVERAGING
WEIGHTING FACTORS
301
302
303
304
N TO Q DYNAMICS
T5 TO Q DYNAMICS
P3 TO Q DYNAMICS
WF TO Q DYNAMICS
230
UN-CORRECT δ
δ
232
PREDICTED TORQUE Q
FIG. 3

SYSTEMS AND METHODS FOR DETERMINING ENGINE TORQUE VALUES

TECHNICAL FIELD

The present invention generally relates to engines, and, more particularly, to systems and methods for estimating torque values in an engine, for example, a gas turbine engine.

BACKGROUND

Determining torque values for engines, such as aircraft gas turbine engines, is becoming increasingly desirable. Such torque determination may be used in the development of new engines, as well as the monitoring of presently operating engines. In addition, in the context of presently operating engines, redundant values of engine torque may be desired. For example, in an aircraft gas turbine engine, a redundant value of torque may be desired to serve as a check on an operating engine torque sensor, and/or to serve as a backup means for estimating the engine torque.

Today, engine torque values are often estimated using a single input, such as fuel flow. However, this may not always yield accurate results, as multiple parameters or inputs may have an impact on engine torque values. Other techniques are very computationally complex, which can consume valuable computational time and/or computing resources during the operation of the gas turbine engine or other device. In addition, it may be difficult for such techniques to provide accurate results in real time and/or in transient conditions.

Accordingly, it is desirable to provide systems that provide for improved estimation of engine torque values, for example that are relatively more accurate, that are relatively less computationally complex, that consume relatively less computational time and/or computing resources, and/or that provide for potentially improved results in real time and/or in transient conditions. It is also desirable to provide program products and methods for such improved estimation of engine torque values. Furthermore, other desirable features and characteristics of the present invention will be apparent from the subsequent detailed description and the appended claims, taken in conjunction with the accompanying drawings and the foregoing technical field and background.

BRIEF SUMMARY

In accordance with one exemplary embodiment of the present invention, a method for estimating the torque value of an engine is provided. The method comprises the steps of obtaining initial variable values, generating corrected variable values from the initial variable values, and determining a torque measure using the corrected variable values. Each initial variable value pertains to one of a plurality of initial variables pertaining to the engine. Each corrected variable value pertains to a corrected variable that represents two or more of the initial variables.

In another exemplary embodiment of the present invention, a program product for estimating the torque value of an engine is provided. The program product comprises a program and a computer readable signal bearing medium. The program is configured to at least facilitate obtaining initial variable values, generating corrected variable values from the initial variable values, and determining a torque measure using the corrected variable values. Each initial variable value pertains to one of a plurality of initial variables pertaining to the engine. Each corrected variable value pertains to a corrected variable that represents two or more of the initial variables. The computer readable signal bearing medium bears the program.

In a further exemplary embodiment of the present invention, a system for estimating the torque value of an engine is provided. The system comprises an interface and a processor. The interface is configured to at least facilitate obtaining initial variable values. Each initial variable value pertains to one of a plurality of initial variables pertaining to the engine. The processor is coupled to the interface, and is configured to at least facilitate generating corrected variable values from the initial variable values and determining a torque measure using the corrected variable values. Each corrected variable value pertains to a corrected variable that represents two or more of the initial variables.

BRIEF DESCRIPTION OF THE DRAWINGS

The present invention will hereinafter be described in conjunction with the following drawing figures, wherein like numerals denote like elements, and wherein:

FIG. 3 is a functional flow diagram of the engine torque prediction process of FIG. 3, in accordance with an exemplary embodiment of the present invention.

DETAILED DESCRIPTION

The following detailed description is merely exemplary in nature and is not intended to limit the invention or the application and uses of the invention. Furthermore, there is no intention to be bound by any theory presented in the preceding background or the following detailed description. In this regard, although various embodiments are described herein in the context of a gas turbine engine, such as may be used as an aircraft propulsion engine, the embodiments may be used with various other machines and in various other end-use environments.

Figure 1:
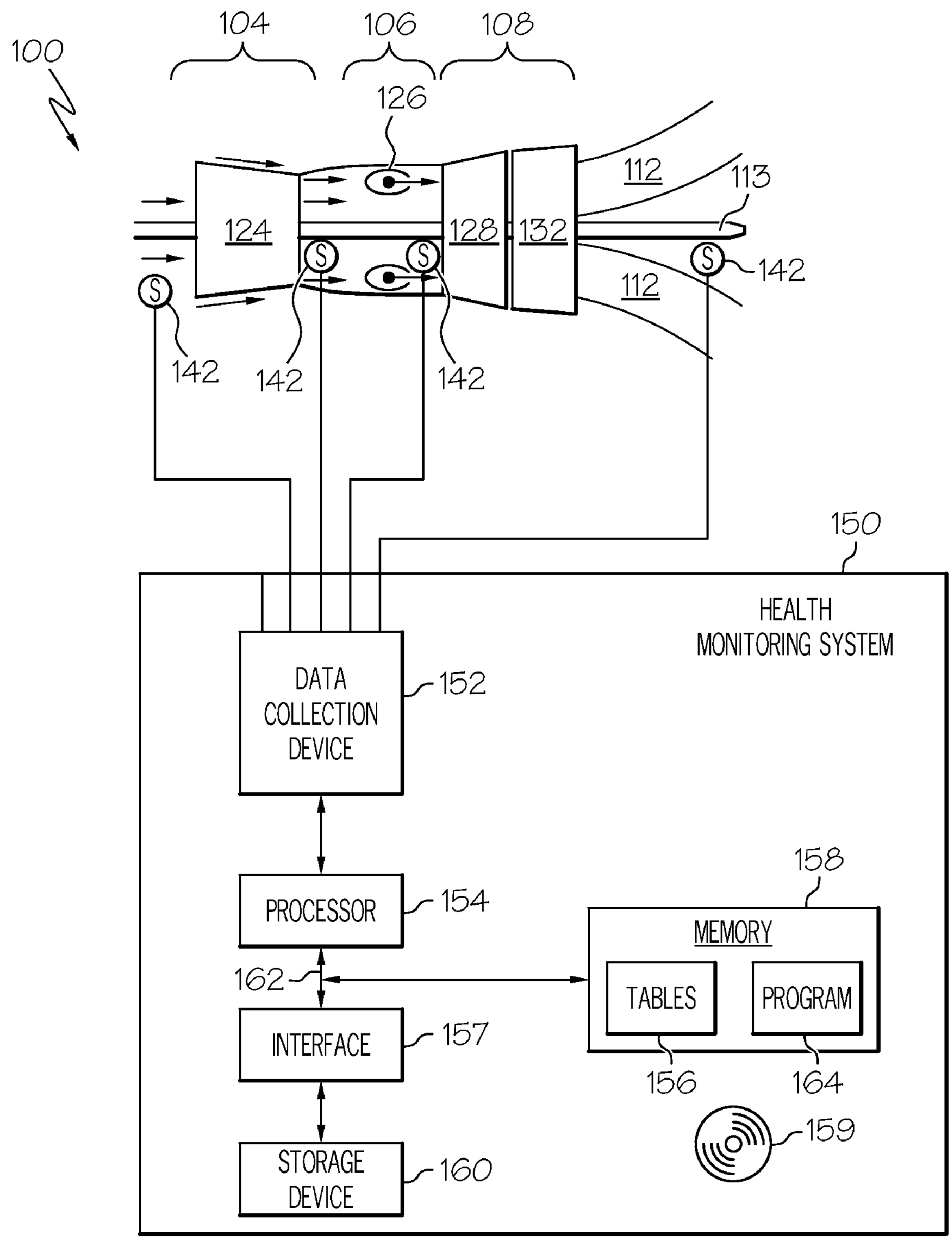
FIG. 1 is a functional block diagram of an exemplary gas turbine engine system and an exemplary health monitoring system for monitoring the health of the gas turbine engine system and related values, such as engine torque, relating to the gas turbine engine, in accordance with an exemplary embodiment of the present invention.

Turning now to FIG. 1, a functional block diagram of an exemplary gas turbine engine 100 is depicted, along with and an exemplary vehicle health monitoring system 150 for monitoring the health of the gas turbine engine 100 along with related values, such as engine torque, relating to the gas turbine engine 100. The depicted engine 100 is a single-spool turboshaft gas turbine propulsion engine, and includes a compressor section 104, a combustion section 106, a turbine section 108, an exhaust section 112, and a free power turbine with output shaft 113.

The compressor section 104 may include one or more compressors 124, which raise the pressure of air and directs the compressed air into the combustion section 106. In the depicted embodiment, only a single compressor 124 is shown, though it will be appreciated that one or more additional compressors could be used. In the combustion section 106, which includes a combustor assembly 126, the compressed air is mixed with fuel supplied from a non-illustrated fuel source. The fuel and air mixture is combusted, and the high energy combusted air mixture is then directed into the high pressure turbine 128.

In the depicted embodiment, the turbine section 108 includes two turbines, a high pressure turbine 128, and a free power turbine 132. However, it will be appreciated that the engine 100 could be configured with more or less than this number of turbines. No matter the particular number, the combusted air mixture from the combustion section 106 expands through each turbine 128, 132, causing it to rotate. This causes the power shaft 113 to rotate, as the power shaft 113 generates power for the aircraft or other vehicle or device using the gas turbine engine 100. The combusted air mixture is exhausted via the exhaust section 112.

As FIG. 1 further depicts, a plurality of sensors 142 may be disposed in or near the engine 100. Each of the sensors 142 is coupled to a data collection device 152 and is operable to sense an engine parameter and supply data representative of the sensed parameter to the data collection device 152. In a preferred embodiment, the sensors include at least the following: an engine torque sensor, a fuel flow sensor, an engine temperature sensor, an inlet temperature sensor, and an engine inlet pressure sensor.

It will be appreciated that the particular number, type, and location of the sensors 142 may vary. It will additionally be appreciated that the number and types of performance data supplied by the sensors 142 may vary depending, for example, on the particular engine type and/or configuration. In the depicted embodiment, however, at least a subset of the depicted sensors 142 supply performance data representative of, or that may be used to determine, engine torque, engine inlet pressure, engine inlet temperature, engine speed, fuel flow, compressor discharge pressure, turbine inlet temperature, shaft horsepower, and thrust, to name just a few.

The data is supplied to the vehicle health monitoring system 150, and preferably to the data collection device 152 thereof. The data collection device 152 may also be variously configured and implemented. For example, the data collection device 152 may be the flight data recorder for an aircraft, or a portion of the flight data recorder. The data collection device 152 may alternatively be part of another system installed within an aircraft such as an Engine Control Unit (ECU), or it may be a stand-alone device such as a Health Utilization and Monitoring System (HUMS). The data collection device 152 may be implemented using various types of static RAM (random access memory) or other suitable read/write memory device. In any case, the data collection device 152 receives and stores, at least temporarily, at least a portion of the performance data supplied thereto by the sensors 142. The data collection device 152 may also be coupled to, rather than a part of, the vehicle health monitoring system 150 in certain embodiments.

The data collected within the data collection device 152 are used to conduct data analysis and estimation of values of the engine 100. Specifically, in a preferred embodiment, the data include a direct measure of engine torque from a torque sensor 142, along with various other inputs obtained from various other sensors 142 (such as engine inlet pressure, engine inlet temperature, engine speed, fuel flow, compressor discharge pressure, turbine inlet temperature, engine torque, shaft horsepower, and/or thrust, among other possible inputs) that are used by the vehicle health monitoring system as a redundancy check on the direct measure of engine torque obtained from the torque sensor.

As depicted in FIG. 1, the vehicle health monitoring system 150 comprises a computer system that preferably includes, in addition to the above-referenced data collection device 152, a processor 154, an interface 157, a memory 158, a storage device, and a bus 162. The processor 154 of the vehicle health monitoring system 150 is coupled to the data collection device 152. The processor 154 performs the computation and control functions of the vehicle health monitoring system 150, and may comprise any type of processor 154 or multiple processors 104, single integrated circuits such as a microprocessor, or any suitable number of integrated circuit devices and/or circuit boards working in cooperation to accomplish the functions of a processing unit. In so doing, the processor 154 is configured to process the engine torque values and the input values received via the data collection device 152 and to conduct redundancy checks on the engine torque values through the use of corrected variable values that are based upon the input values.

During operation, the processor 154 executes one or more vehicle health monitoring programs 164 preferably stored within the memory 158 and, as such, controls the general operation of the vehicle health monitoring system 150. Such one or more vehicle health monitoring programs 164 are preferably coupled with a computer-readable signal bearing media bearing the product. Such program products may reside in and/or be utilized in connection with any one or more different types of vehicle health monitoring systems 150 and/or other computer systems, which can be located in a central location or dispersed and coupled via an Internet or various other different types of networks or other communications. In certain exemplary embodiments, the processor 154 and/or program products may be used to implement a process for determining values of engine torque, preferably via the engine torque prediction process 200 depicted in FIGS. 2 and 3 and described further below in connection therewith, in accordance with an exemplary embodiment of the present invention. For example, in certain such exemplary embodiments, the one or more program products may be used to operate the various components of the vehicle health monitoring system 150, to connect such components, or to control or run various steps pertaining thereto in order to facilitate processes for determining engine torque.

In a preferred embodiment, the processor 154, in implementing the depicted method, retrieves at least a portion of the data that are collected during, for example, the flight of the aircraft in which the engine 100 is installed. In the depicted embodiment, the processor 154 reads initial variable values pertaining to various input variables, and then corrects the performance data for the ambient conditions and/or other input variable values at the time the data were collected by applying what are generally referred to as the theta correction ($\theta$-correction) and the delta correction ($\delta$-correction). As is generally known, the $\theta$-correction is an ambient temperature correction factor, and the $\delta$-correction is an ambient pressure correction factor. It will be appreciated that application of the ambient condition corrections is merely preferred, and need not be implemented if so desired.

It will be appreciated that the data analysis and estimation of values may be conducted in real-time, while the engine 100 is operating, at some time after the collected performance data have been read by the vehicle health monitoring system 150 and/or another device from the data collection device 152, whether the engine 100 is running or not, or at some time after the engine 100 has been shutdown. No matter when the data analysis and estimation of values is conducted, the data analysis and estimation of values is preferably conducted using a suitably programmed processor 154 that is preferably part of the vehicle health monitoring system 150 and coupled to the data collection device 152. The processor 154, which may be implemented using one or more suitable general purpose microprocessors, may be part of the same system as the data collection device 152, or it may be a stand-alone system that is configured to at least temporarily interface with the data collection device 152. Moreover, in some embodiments the data collection device 152 may, along with the processor 154, comprise a single machine, device, and/or system.

The memory 158 stores one or more programs 164 that at least facilitates one or more processes for determining engine torque values, such as the engine torque prediction process 200 depicted in FIGS. 2 and 3 and described further below in connection therewith and/or facilitating operation of the vehicle health monitoring system 150 and/or various components thereof, such as those described above. The memory 158 can be any type of suitable memory. This would include the various types of dynamic random access memory (DRAM) such as SDRAM, the various types of static RAM (SRAM), and the various types of non-volatile memory (PROM, EPROM, and flash). It should be understood that the memory 158 may be a single type of memory component, or it may be composed of many different types of memory components. The memory 158 also preferably stores various look-up tables 156 for use in the engine torque determination for use in connection with corrected variables, as described in greater detail further below in connection with FIGS. 2 and 3. In addition, the memory 158 and the processor 154 may be distributed across several different computers that collectively comprise the vehicle health monitoring system 150. For example, a portion of the memory 158 may reside on a computer within a particular apparatus or process, and another portion may reside on a remote computer.

The computer bus 162 serves to transmit programs, data, status and other information or signals between the various components of the vehicle health monitoring system 150. The computer bus 162 can be any suitable physical or logical means of connecting computer systems and components. This includes, but is not limited to, direct hard-wired connections, fiber optics, and infrared and wireless bus technologies.

The computer interface 157 allows communication to the vehicle health monitoring system 150, for example from a system operator and/or another computer system, and can be implemented using any suitable method and apparatus. It can include one or more network interfaces to communicate to other systems or components, one or more terminal interfaces to communicate with technicians, and one or more storage interfaces to connect to storage apparatuses such as the storage device 160.

The storage device 160 can be any suitable type of storage apparatus, including direct access storage devices 160 such as hard disk drives, flash systems, floppy disk drives and optical disk drives. In one exemplary embodiment, the storage device 160 is a program product from which memory 158 can receive a program 164 that at least facilitates determining engine torque values for an engine, such as the engine torque prediction process 200 of FIGS. 2 and 3 and described further below in connection therewith, and/or that facilitates operation of the vehicle health monitoring system 150 or components thereof. The storage device 160 can comprise a disk drive device that uses disks 159 to store data. As one exemplary implementation, the vehicle health monitoring system 150 may also utilize an Internet website, for example for providing or maintaining data or performing operations thereon.

It will be appreciated that while this exemplary embodiment of the vehicle health monitoring system 150 is described in the context of a fully functioning computer system, those skilled in the art will recognize that the mechanisms of the present invention are capable of being distributed as a program product in a variety of forms, and that the present invention applies equally regardless of the particular type of computer-readable signal bearing media used to carry out the distribution. Examples of signal bearing media include: recordable media such as floppy disks, hard drives, memory cards and optical disks, and transmission media such as digital and analog communication links.

Figure 2:
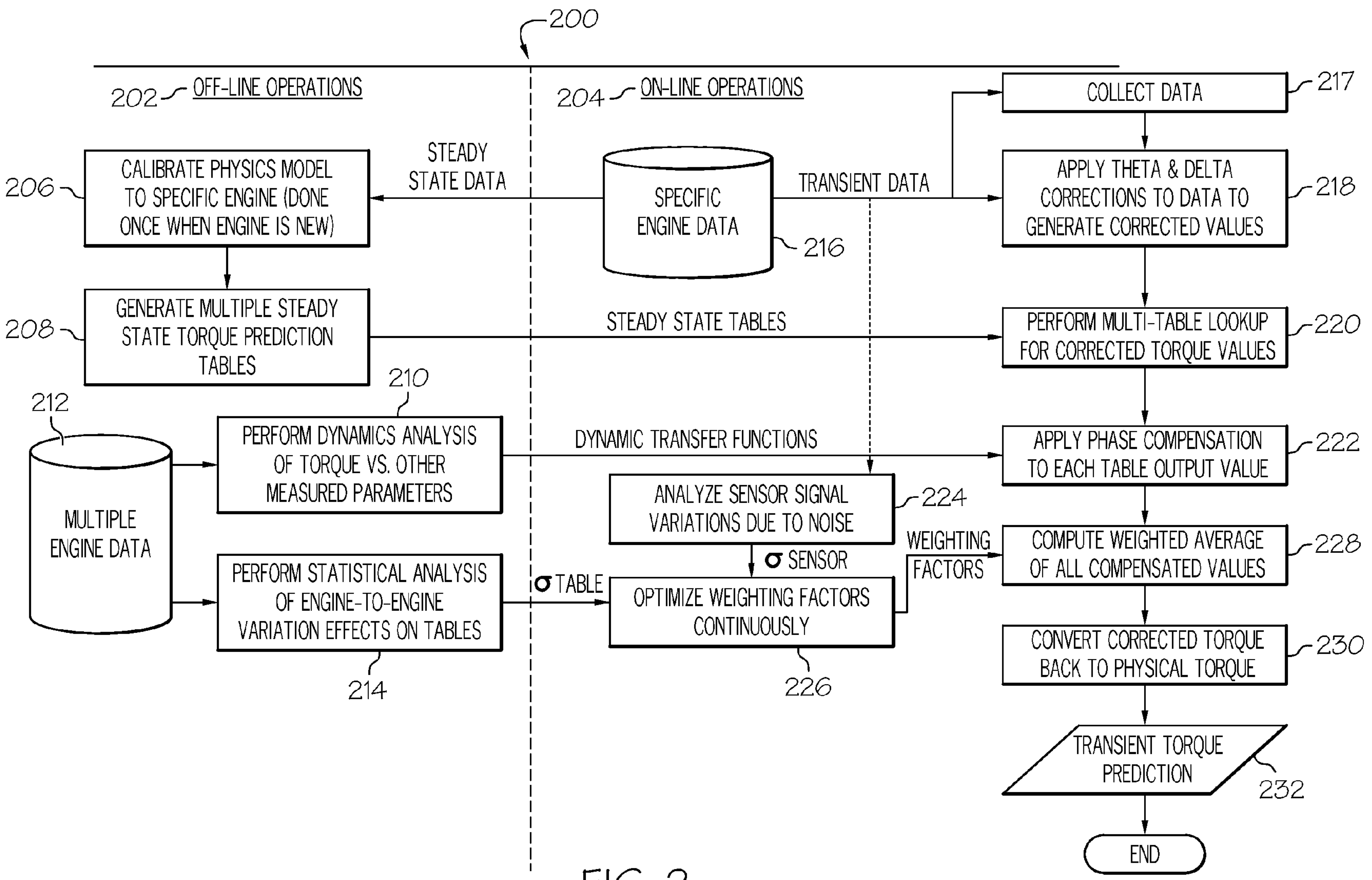
FIG. 2 is a flowchart of an engine torque prediction process for determining engine torque measures from a gas turbine engine, such as the gas turbine engine of FIG. 1, and that can be implemented by the vehicle health monitoring system of FIG. 1, in accordance with an exemplary embodiment of the present invention.

FIG. 2 is a flowchart of an engine torque prediction process 200 for determining engine torque measures from a gas turbine engine, such as the gas turbine engine 100 of FIG. 1, and that can be implemented by the vehicle health monitoring system 150 of FIG. 1, in accordance with an exemplary embodiment of the present invention. As depicted in FIG. 2, in a preferred embodiment the engine torque prediction process 200 comprises various off-line operations 202 and various on-line operations 204. In certain embodiments, the vehicle health monitoring system 150 of FIG. 1 performs the various off-line operations 202 and the various on-line operations 204. However, in various other embodiments, some or all of the off-line operations 202 may be conducted by one or more other devices and/or systems.

In the depicted embodiment, the off-line operations 202 portion of the engine torque prediction process 200 begins with the calibration of a physics-based model to a specific engine (step 206). In a preferred embodiment, steady state data from engine-specific data 216 (preferably including steady state values of engine torque, engine inlet pressure, engine inlet temperature, engine speed, fuel flow, compressor discharge pressure, and turbine inlet temperature pertaining to the gas turbine engine 100 of FIG. 1 under steady state conditions) is utilized in this step. Also in a preferred embodiment, the physics-based model includes various variables relating to the operation of the gas turbine engine 100 of FIG. 1, measures of performance and operation thereof, and environmental and other factors that may influence the performance and/or operation of the gas turbine engine 100 of FIG. 1. Also in a preferred embodiment, the calibration is performed while the gas turbine engine 100 is newly manufactured, for example in concert with other testing is already being conducted (for example, acceptance testing).

In addition, a plurality of steady state torque prediction tables are generated (step 208). The steady state torque prediction tables each preferably comprises a look-up table relating a different corrected variable to an initial torque measure using a data compression technique. Specifically, each such corrected variable represents a plurality of steady state input variables, such as engine inlet pressure, engine inlet temperature, engine speed, fuel flow, compressor discharge pressure, turbine inlet temperature, that may affect the engine torque. The initial torque represents an initial torque measure, and preferably represents the value of engine torque divided by delta. As is commonly used in the field, delta represents a measure of atmospheric pressure.

The off-line operations 202 of the engine torque prediction process 200 also utilize multiple engine data 212 in performing dynamics analysis of engine torque versus other measured parameters (such as, by way of example only, engine inlet pressure, engine inlet temperature, engine speed, fuel flow, compressor discharge pressure, turbine inlet temperature) (step 210) and in performing statistical analysis of how engine-to-engine variations or other factors may affect the accuracy of various torque prediction tables (step 214).

Turning now to the on-line operations 204, data is collected pertaining to the engine (step 217). In a preferred embodiment, the data collected in step 217 includes transient values of various input variables including engine inlet pressure, engine inlet temperature, engine speed, fuel flow, compressor discharge pressure, and turbine inlet temperature pertaining to the gas turbine engine 100 of FIG. 1 under transient conditions, and is preferably obtained from the engine-specific data 216. Also in a preferred embodiment, the data is collected by the data collection device 152 of the vehicle health monitoring system 150 of FIG. 1.

Corrected variable values are then generated from the data (step 218). In a preferred embodiment, the corrected variable values are generated by applying the above-referenced theta and delta corrections to the data in order to generate compressed data values of corrected variables. Each corrected variable pertains to a plurality of the input variables for which values where obtained in step 217. This provides for improved computational power and efficiency. In a preferred embodiment, the theta and delta corrections are made by, and the corrected variable values are thereby generated by, the processor 154 of FIG. 1.

Corrected torque values are then calculated utilizing the corrected variable values from step 218 and the steady state torque tables from step 208 (step 220). Specifically, in a preferred embodiment, the look-up tables are examined for the particular corrected variable values from step 218, and corresponding corrected torque values are thereby obtained as table output values from the steady state tables. This preferably results in an initial corrected torque measure that accounts for steady state characteristics of the engine. This step is preferably also conducted by the processor 154 of FIG. 1.

The table output values, or initial corrected torque measures as referenced above, are then adjusted for transient conditions (step 222). Specifically, a phase compensation technique is applied to these initial corrected torque measures to yield transient predicted values of corrected engine torque. In a preferred embodiment, one or more transfer functions are used in conducting the phase compensation. Also in a preferred embodiment, the phase compensation techniques are implemented by the processor 154 of FIG. 1.

In addition, various sensor signal variations are analyzed (step 224). In a preferred embodiment, various sensors 142 of FIG. 1 use in obtaining the various input variables are analyzed for noise, and for evaluating the likely accuracy and reliability of the values of the various input variables generated by such sensors 142. The results from this analysis and those from step 214 are then used to generate and optimize weighting factors for computing the weighted average of various compensated table output variables from step 222 (step 226). Specifically, the compensated table output variables that are derived from input variables with more accurate and reliable values or those derived from tables with higher accuracy and less engine-to-engine variations are provided a larger weighting factor, and thus such input variables will be provided relatively more weight in determining the engine torque values. The sensor analysis and the generation and optimization of the weighting factors for the weighting factors are preferably conducted continuously by the processor 154 of FIG. 1 while the engine torque prediction process 200 is ongoing and while the engine is operating.

The optimized weighting factors are then utilized in computing a weighted average of all compensated values (step 228). Specifically, in steps 220 and 222 a different corrected/compensated estimated torque measure is preferably calculated for each different corrected variable, and the different resulting corrected/compensated torque measures are then averaged together in step 228 utilizing the optimized weighting factors from step 226. In a preferred embodiment, this computation and the related steps are also performed by the processor 154 of FIG. 1.

After the corrected/compensation estimated torque values are averaged, the resulting averaged torque value is then converted back into a physical torque value (step 230). Specifically, in a preferred embodiment, the resulting averaged torque value is converted back into a physical torque value by the processor 154 of FIG. 1, using the input variable values collected from the engine-specific data 216 in step 217.

As a result, a transient torque prediction is thereby generated (step 232). The transient torque prediction can be used as a back-up or redundant value for checking the engine torque sensor 142 and the results generated thereby. In addition, the transient torque prediction can be used if the engine torque sensor 142 is experiencing difficulties and/or is not operational.

Turning now to FIG. 3, a functional flow diagram of the engine torque prediction process 200 of FIG. 2 is provided, in accordance with an exemplary embodiment of the present invention. The functional flow diagram illustrates how the engine-specific data 216 and the multiple engine data 212 of FIG. 1 are both utilized in the weight optimization in step 226. Specifically, the weight optimization in step 226 preferably utilizes values of sensor variations as determined from the engine-specific data, along with table variations as determined from the multiple engine data 212, and most preferably from engine-to-engine variations and any model inaccuracy ascertained therefrom.

Also as depicted in FIG. 3, the engine-specific data 216 include physical values that are used in the generation of the corrected variable values via the application of the theta and delta corrections of step 218. Specifically, in a preferred embodiment, the physical values obtained from the engine-specific data 216 and used for this purpose include values of engine inlet pressure (P1), engine temperature (T1), engine speed (N), turbine inlet temperature (T5), compressor discharge pressure (P3), and fuel flow (WF) as the input variables. The input variables may vary in certain embodiments. For example, other input variables may also be used.

Also as shown in FIG. 3, different corrected variables are preferably generated using these different input variables. Specifically, in the depicted embodiment, (i) a first corrected input variable includes engine speed adjusted for engine inlet temperature (denoted as N divided by the square root of theta); (ii) a second corrected input variable includes a measure of turbine inlet temperature adjusted for an engine inlet temperature value (denoted as T5 divided by theta); (iii) a third corrected input variable includes a measure of compressor discharge pressure adjusted for and engine inlet pressure value (denoted as P3 divided by delta); and (iv) a fourth corrected input variable includes fuel flow adjusted for both engine inlet temperature and pressure (denoted as WF divided by the product of delta and the square root of theta).

Each of the corrected look-up tables preferably represents a relationship between one of these corrected input variables and a steady state value of corrected engine torque. As shown in FIG. 3, in a preferred embodiment, each of the steady state values of corrected engine torque is obtained from a respective look-up table utilizing values of the above-referenced corrected input variables as generated in step 218. Specifically, as depicted in FIG. 3, (i) a first steady state value of corrected engine torque (denoted as $Q_1$ divided by delta) is generated from the above-referenced first corrected input variable and a first steady-state look-up table 301 associated therewith; (ii) a second steady state value of corrected engine torque (denoted as $Q_2$ divided by delta) is generated from the above-referenced second corrected input variable and a second steady-state look-up table 302 associated therewith; (iii) a third steady state value of corrected engine torque (denoted as $Q_3$ divided by delta) is generated from the above-referenced third corrected input variable and a third steady-state look-up table 303 associated therewith; and (iv) a fourth steady state value of corrected engine torque (denoted as $Q_4$ divided by delta) is generated from the above-referenced fourth corrected input variable and a fourth steady-state look-up table 304 associated therewith.

Phase compensation techniques are then utilized in step 222 to convert each of the four steady state values of corrected engine torque to respective transient values of corrected engine torque. Specifically, in a preferred embodiment depicted in FIG. 3, (i) the first steady state value of corrected engine torque is converted to a first transient value of corrected engine torque (represented by $Qc_1$ divided by delta) using dynamics (and preferably using transfer functions) relating engine speed to engine torque under transient conditions of the engine; (ii) the second steady state value of corrected engine torque is converted to a second transient value of corrected engine torque (represented by $Qc_2$ divided by delta) using dynamics (and preferably using transfer functions) relating turbine inlet temperature to engine torque under transient conditions of the engine; (iii) the third steady state value of corrected engine torque is converted to a third transient value of corrected engine torque (represented by $Qc_3$ divided by delta) using dynamics (and preferably using transfer functions) relating compressor discharge pressure to engine torque under transient conditions of the engine; and (iv) the fourth steady state value of corrected engine torque is converted to a fourth transient value of corrected engine torque (represented by $Qc_4$ divided by delta) using dynamics (and preferably using transfer functions) relating fuel flow to engine torque under transient conditions of the engine.

The transient values of corrected engine torque are then aggregated in step 228 utilizing the weighting factors generated and optimized in step 226. Specifically, in a preferred embodiment, in step 228 (i) the first transient value of corrected engine torque is assigned a first weighting value corresponding to an estimated accuracy and reliability of values of the above-reference first corrected input variable and using sensors relating thereto; (ii) the second transient value of corrected engine torque is assigned a second weighting value corresponding to an estimated accuracy and reliability of values of the above-reference second corrected input variable and using sensors relating thereto; (iii) the third transient value of corrected engine torque is assigned a third weighting value corresponding to an estimated accuracy and reliability of values of the above-reference third corrected input variable and using sensors relating thereto; and (iv) the fourth transient value of corrected engine torque is assigned a second weighting value corresponding to an estimated accuracy and reliability of values of the above-reference fourth corrected input variable and using sensors relating thereto.

Each of the first, second, third, and fourth transient values of corrected engine torque are then multiplied by their respective weighting factors and then added together to yield a weighted average of corrected engine torque (represented by $Q_c$ divided by delta) in step 228, as shown in FIG. 3. The weighed average of corrected engine torque is then converted back into a physical torque parameter in step 230, preferably by multiplying the weighted average of corrected engine torque by the above-referenced delta value, as is also shown in FIG. 3. This results in the final predicted torque value (denoted as Q) referenced in step 232.

It will be appreciated that the various steps of the engine torque prediction process 200 of FIGS. 2 and 3 may vary from those depicted in FIGS. 2 and 3 and described above, and/or that certain steps may be conducted simultaneously and/or in a different order than as depicted and/or described. For example, while four corrected input variables, four corresponding corrected torque values, and four corresponding transient corrected torque values are depicted in FIG. 3 and described above, it will be appreciated that these numbers may vary in other embodiments. Preferably, regardless of the number of corrected input variables, there will be one corresponding steady state corrected torque value and one transient corrected torque value corresponding to each such corrected input variable. However, other variations may also occur in various other embodiments. For example, the tables shown in the process 200 of FIGS. 2 and 3 can be multi-input tables instead of single-input tables by adding corrected power turbine speed as an addition input axis. It will similarly be appreciated that the vehicle health monitoring system 150 of FIG. 1 and/or one or more components thereof may also differ from the depiction in FIG. 1 and/or the description above in connection therewith.

Accordingly, improved methods, program products, and systems are provided. The improved programs, program products, and systems allow for improved estimation of engine torque values, for example that are relatively more accurate, relatively less computationally complex, that consume relatively less computational time and/or computing resources, and/or that provide for potentially improved results in real time and/or in transient conditions. While the improved methods, program products, and systems are described above as used in connection with gas turbine engines for aircraft in accordance with an exemplary embodiment of the present invention, it will be appreciated that, in various embodiments, the improved methods, program products, and systems may be used in connection with any number of other different types of engines and/or in connection with any number of other different types of vehicles, health monitoring systems, and/or any number of other different types of devices, techniques, processes, and/or other implementations.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for estimating the torque value of an engine, the method comprising the steps of:

obtaining initial variable values, each initial variable value pertaining to one of a plurality of initial variables pertaining to the engine;

generating corrected variable values from the initial variable values, each corrected variable value pertaining to a corrected variable that represents two or more of the initial variables;

determining, using a processor, an initial torque value using the corrected variable values, the initial torque value representing a steady state condition of the engine;

determining, using the processor, a corrected torque value using the initial torque values using a phase compensation technique, the corrected torque value representing a transient state of the engine; and determining, using the processor, a torque measure using the corrected torque value and one or more of the initial variable values.

2. The method of claim 1, wherein the step of generating corrected variable values from the initial variable values comprises the step of:

generating corrected variable values from the initial variable values, each corrected variable value pertaining to one of a plurality of corrected variables, each corrected variable representing two or more of the initial variables.

3. The method of claim 2, further comprising the step of:

assigning weighting values to each of the plurality of corrected variables based at least in part on an estimated accuracy of the corrected variable values pertaining to such corrected variables;

wherein the step of determining the torque measure comprises the step of determining the torque measure using the corrected variable values and the weighting values.

4. The method of claim 1, wherein:

the step of generating corrected variable values from the initial variable values comprises the step of generating corrected variable values from the initial variable values, each corrected variable value pertaining to one of a plurality of corrected variables, each corrected variable representing two or more of the initial variables.

5. The method of claim 4, further comprising the step of:

generating a plurality of tables, each table representing a relationship between one of the corrected variables and the corrected torque value;

wherein the step of determining the corrected torque value comprises the step of determining the corrected torque value using the corrected variable values and the plurality of tables.

6. A program product for estimating the torque value of an engine, the program product comprising:

a program configured to at least facilitate:

obtaining initial variable values, each initial variable value pertaining to one of a plurality of initial variables pertaining to the engine;

generating corrected variable values from the initial variable values, each corrected variable value pertaining to a corrected variable that represents two or more of the initial variables;

determining an initial torque value using the corrected variable values, the initial torque value representing a steady state condition of the engine;

determining a corrected torque value using the initial torque values using a phase compensation technique, the corrected torque value representing a transient state of the engine; and determining a torque measure using the corrected torque value and one or more of the initial variable values; and a non-transitory computer readable medium bearing the program and containing computer instructions stored therein for causing a computer processor to perform the program.

7. The program product of claim 6, wherein the program product is configured to at least facilitate:

generating corrected variable values from the initial variable values, each corrected variable value pertaining to one of a plurality of corrected variables, each corrected variable representing two or more of the initial variables.

8. The program product of claim 7, wherein the program product is configured to at least facilitate:

assigning weighting values to each of the plurality of corrected variables based at least in part on an estimated accuracy of the corrected variable values pertaining to such corrected variables; and determining the torque measure using the corrected variable values and the weighting values.

9. The program product of claim 6, wherein the program product is configured to at least facilitate:

generating a plurality of tables, each table representing a relationship between one of the corrected variables and the corrected torque value; and determining the corrected torque value using the corrected variable values and the plurality of tables.

10. A system for determining a torque value of an engine, the system comprising:

an interface configured to at least facilitate obtaining initial variable values, each initial variable value pertaining to one of a plurality of initial variables pertaining to the engine; and a processor coupled to the interfaced and configured to at least facilitate:

generating corrected variable values from the initial variable values, each corrected variable value pertaining to one of a plurality of corrected variables, each corrected variable representing two or more of the initial variables;

assigning weighting values to each of the plurality of corrected variables based at least in part on an estimated accuracy of the corrected variable values pertaining to such corrected variables; and determining a torque measure using the corrected variable values and the weighting values.

11. The system of claim 10, wherein the processor is configured to at least facilitate:

determining a corrected torque value using the corrected variable values; and determining the torque measure using the corrected torque value and one or more of the initial variable values.

12. The system of claim 11, wherein the processor is configured to at least facilitate:

determining an initial torque value using the corrected variable values, the initial torque value representing a steady state condition of the engine; and determining the corrected torque value using the initial torque values using a phase compensation technique, the corrected torque value representing a transient state of the engine.

13. The system of claim 12, further comprising:

a memory configured to at least facilitate storing a plurality of tables, each table representing a relationship between one of the corrected variables and the corrected torque value;

wherein the processor is coupled to the memory and configured to at least facilitate determining the corrected torque value using the corrected variable values and the plurality of tables.

* * * * *